United States Patent
Shacham et al.

(10) Patent No.: US 9,367,447 B2
(45) Date of Patent: Jun. 14, 2016

(54) REMOVABLE MEMORY CARD DISCRIMINATION SYSTEMS AND METHODS

(71) Applicant: QUALCOMM Incorporated, San Diego, CA (US)

(72) Inventors: Assaf Shacham, Zichron Yaakov (IL); Amit Gil, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 14/080,852

(22) Filed: Nov. 15, 2013

(65) Prior Publication Data

US 2015/0143022 A1 May 21, 2015

(51) Int. Cl.
 G06F 12/00 (2006.01)
 G06F 12/02 (2006.01)
 G06F 13/40 (2006.01)

(52) U.S. Cl.
 CPC ........ G06F 12/0246 (2013.01); G06F 12/0238 (2013.01); G06F 13/4068 (2013.01); G06F 2212/7207 (2013.01)

(58) Field of Classification Search
 CPC .......................... G06F 12/0238; G06F 12/0246
 See application file for complete search history.

(56) References Cited

U.S. PATENT DOCUMENTS

| | | | |
|---|---|---|---|
| 5,983,288 A | 11/1999 | Visee | |
| 6,725,291 B2 | 4/2004 | Lai et al. | |
| 7,899,967 B2 | 3/2011 | Chi et al. | |
| 8,301,822 B2 | 10/2012 | Pinto et al. | |
| 2010/0205341 A1 | 8/2010 | Chen | |
| 2011/0072185 A1* | 3/2011 | Pinto et al. | 710/315 |

FOREIGN PATENT DOCUMENTS

| | | |
|---|---|---|
| TW | 201017552 A | 5/2010 |
| WO | 2011018677 A1 | 2/2011 |

OTHER PUBLICATIONS

International Search Report and Written Opinion for PCT/US2014/065601, mailed Apr. 8, 2015, 9 pages.
International Preliminary Report on Patentability for PCT/US2014/065601, mailed Mar. 8, 2016, 13 pages.

* cited by examiner

*Primary Examiner* — Shawn X Gu
(74) *Attorney, Agent, or Firm* — Withrow & Terranova, PLLC

(57) ABSTRACT

Removable memory card discrimination systems and methods are disclosed. In particular, exemplary embodiments discriminate between secure digital (SD) cards and other removable memory cards that comply with the SD form factor, but support the Universal Flash Storage (UFS) protocol. That is, a host may have a receptacle that supports the SD card form factor and is configured to receive a device. In use, a removable memory card is inserted into the receptacle and, using an SD compliant interrogation signal, the host interrogates a common area on the card so inserted. The common area includes information related to capability descriptors of the card. An SD compliant card will respond with information such as capability descriptors about the SD protocol capabilities, while a UFS compliant card will respond with an indication that the card is UFS compliant. The host may then restart the communication with the card using the UFS protocol.

20 Claims, 5 Drawing Sheets

REMOVABLE MEMORY CARD DISCRIMINATION SYSTEMS AND METHODS

BACKGROUND

I. Field of the Disclosure

The technology of the disclosure relates generally to removable memory cards.

II. Background

Mobile terminals have become ubiquitous in modern society. While mobile phones, and in particular, smart phones, have garnered the majority of the attention, numerous other mobile terminals such as cameras, audio players, video recorders, and the like are also widely available. Many of these devices rely on removable memory media to store data. For example, a camera may store photos on a removable memory card. Less portable computing devices such as desktop computers may also have receptacles that receive the removable memory card. Continuing the camera example, a person may take a picture with the camera, store the picture on the removable memory card, remove the card from the camera, insert the card into the receptacle on the desktop computer, and transfer the picture to hard drive of the desktop computer.

Many removable memory cards are some form of Flash memory. However, even with the common Flash memory format, there are numerous proprietary removable memory cards including those provided by Compact Flash (I and II), Secure Digital (SD) (SD, miniSD, microSD, SDHC, miniSDHC, microSDHC, SDXC), Memory Stick (Standard, Pro, Pro Duo, Pro-HG Duo, Micro (M2), xC), MultiMediaCard (MMC) (MMC, RS-MMC, MMCmobile, MMCplus, MMC-micro), Serial Peripheral Interface (SPI) mode of operation within a card format, xD (Standard, Type M, Type H, Type M+), XQD, or Ultra High Speed (UHS) (I and II).

In addition to the removable versions of Flash memory, a number of Flash memory protocols exist that are designed for embedded or otherwise non-removable memory units. Such embedded Flash memory units may be soldered or otherwise permanently affixed to the printed circuit boards or substrates of the device. One such protocol is the Universal Flash Storage (UFS) standard proposed by the Joint Electron Device Engineering Council (JEDEC).

To date, UFS has not been applied to a removable memory card protocol. Computing devices will need to be able to deal with UFS compliant removable memory cards.

SUMMARY OF THE DISCLOSURE

Embodiments disclosed in the detailed description include removable memory card discrimination systems and methods. In particular, exemplary embodiments discriminate between secure digital (SD) cards and other removable memory cards that comply with the SD form factor, but support the Universal Flash Storage (UFS) protocol. That is, a host, as that term is defined by the Flash standards, may have a receptacle that supports the SD card form factor and is configured to receive a device, as that term is defined by the Flash standards. In use, a removable memory card is inserted into the receptacle. Using an SD compliant interrogation signal, the host interrogates a common area on the inserted card. In an exemplary embodiment, the common area is the capability descriptor memory area of the card. The capability descriptor memory area includes information related to capability descriptors of the card (e.g., voltage levels required for signaling, data lane capability, speed rating, or the like). In an exemplary embodiment, an SD compliant removable memory card will respond with information, such as capability descriptors about the SD protocol capabilities, while a UFS compliant removable memory card will respond with an indication that the card is UFS compliant. If the removable memory card is UFS compliant, the host may then restart the communication with the card using the UFS protocol.

In this regard in one embodiment, a method for discriminating between removable memory cards configured to communicate with a host system according to different communication protocols placed into a host of a computing device is disclosed. The method comprises the host sending a SD compliant interrogation signal to a common area on a removable memory card. The method also includes the host receiving a capability descriptor stored in the common area from the removable memory card if the removable memory card is SD compliant. The method also comprises the host receiving an indication that the removable memory card is UFS capable if the removable memory card is UFS protocol compliant.

In another embodiment, a method for discriminating between removable memory cards configured to communicate with a host system according to different communication protocols placed into a computing device is disclosed. The method includes sending a SD compliant interrogation signal to a common area on a removable memory card. The method also includes receiving a response that informs the computing device if the removable memory card is SD compliant or is compliant with the UFS protocol.

In another exemplary embodiment, a computing device is disclosed. The computing device includes a user interface having one or more hardware elements configured to interface with a user. The computing device also includes a removable memory card receptacle configured to receive a removable memory card. The computing device also includes a control system operatively coupled to the user interface. The control system is configured to send a SD compliant interrogation signal to a common area on a removable memory card. The control system is also configured to, if the removable memory card is SD compliant, receive a capability descriptor stored in the common area from the removable memory card. The control system is also configured to, if the removable memory card is UFS protocol compliant, receive an indication that the removable memory card is UFS capable.

DETAILED DESCRIPTION

Figure 1:
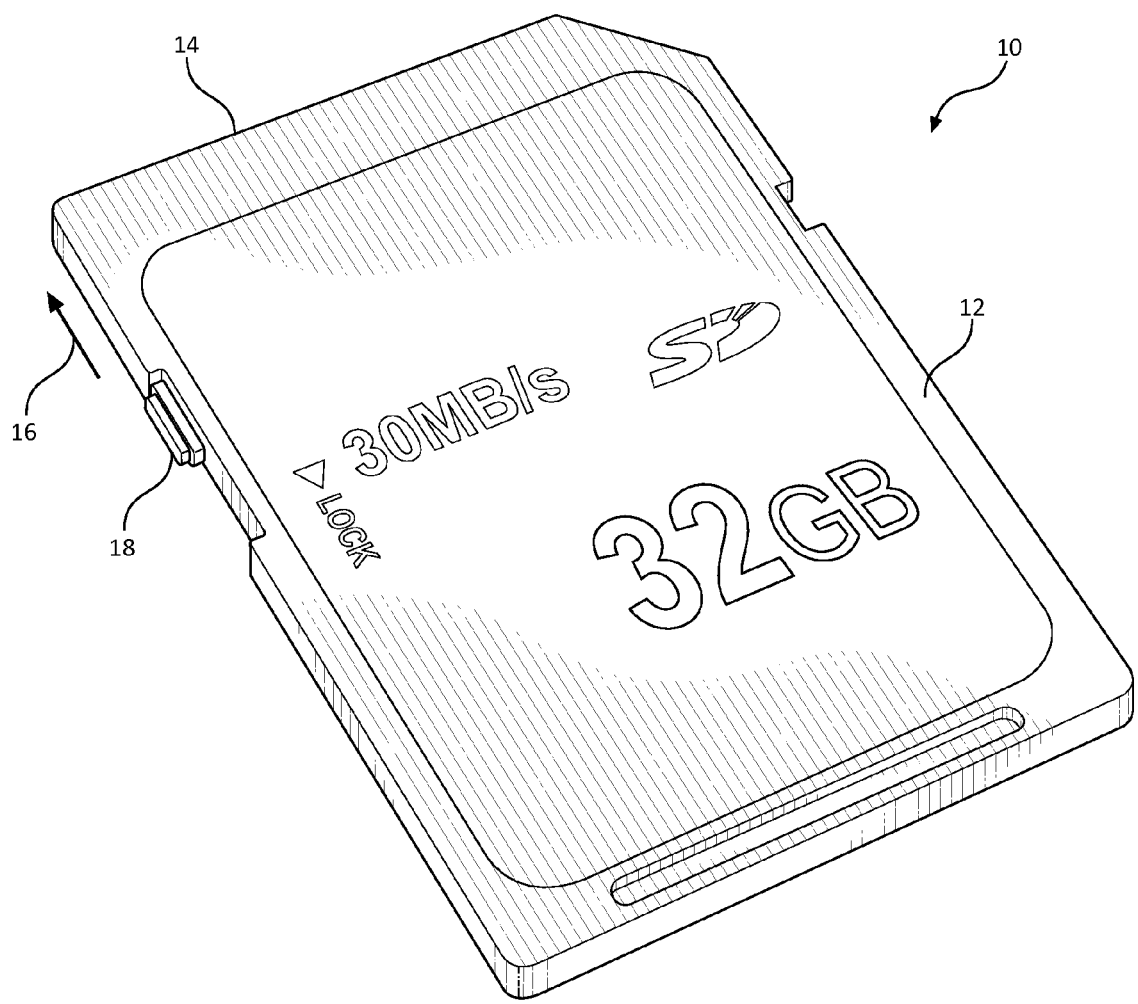
FIG. 1 is a perspective view of a conventional removable memory card conforming to a Secure Digital (SD) protocol.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed in the detailed description include removable memory card discrimination systems and methods. In particular, exemplary embodiments discriminate between secure digital (SD) cards and other removable memory cards that comply with the SD form factor, but support the Universal Flash Storage (UFS) protocol. That is, a host, as that term is defined by the Flash standards, may have a receptacle that supports the SD card form factor and is configured to receive a device, as that term is defined by the Flash standards. In use, a removable memory card is inserted into the receptacle. Using an SD compliant interrogation signal, the host interrogates a common area on the inserted card. In an exemplary embodiment, the common area is the capability descriptor memory area of the card. The capability descriptor memory area includes information related to capability descriptors of the card (e.g., voltage levels required for signaling, data lane capability, speed rating, or the like). In an exemplary embodiment, an SD compliant removable memory card will respond with information, such as capability descriptors about the SD protocol capabilities, while a UFS compliant removable memory card will respond with an indication that the card is UFS compliant. If the removable memory card is UFS compliant, the host may then restart the communication with the card using the UFS protocol.

As noted above, there are two types of Flash memory, removable and embedded. There are several flavors of removable Flash memory including SD, Memory Stick, Compact Flash, and the like. Likewise, there are several flavors of embedded Flash memory with embedded Multimedia Card (eMMC) being the primary flavor. While eMMC is the most common flavor of embedded Flash memory, the Joint Electron Device Engineering Council (JEDEC) is promoting UFS as the next primary standard. To date, JEDEC has focused on implementing UFS only as an embedded Flash product. U.S. Patent Application Ser. No. 61/867,343 filed Aug. 19, 2013, which is hereby incorporated by reference in its entirety advanced the concept of UFS being used for removable memory cards. Because proposals to adopt UFS to a removable memory card are still emerging, the precise details of its implementation have not been standardized. One solution would be to reproduce an existing removable memory card form factor. Reusing existing form factors has the advantage of allowing devices that use removable memory cards to maintain existing receptacles and otherwise minimize change for established products while allowing for incorporation of the new UFS technology. However, once an existing form factor is reused for UFS compliant devices, there should be a way to distinguish between the UFS compliant devices and removable memory cards that conform to the original protocol associated with the form factor.

Before addressing the particulars of discriminating between protocol capabilities of removable memory cards sharing a form factor, a brief overview of hardware used with such process is provided with reference to FIGS. 1-5. A discussion of the process to discriminate between an SD removable memory card and a removable memory card compliant with the UFS protocol is provided with reference to FIG. 6.

In this regard, in FIG. 1 a perspective view of a conventional removable memory card 10 that complies with the SD protocol is illustrated. The removable memory card 10 includes a housing 12, which is typically a plastic housing with a front edge 14 that is inserted into a mobile terminal as generally noted by direction arrow 16. Optionally a lock 18 may be provided to prevent erasing or writing onto the memory elements within the housing 12.

Figure 2:
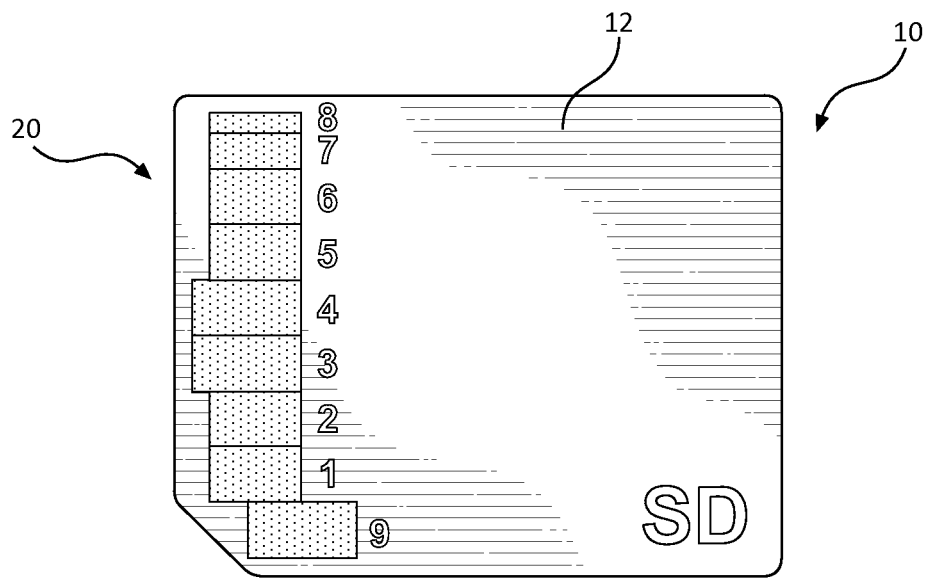
FIG. 2 is a plan view of the conventional removable memory card of FIG. 1 with the pin layout disclosed.

The memory elements within the housing 12 are accessed by pins 20 as illustrated in FIG. 2. Pins 20 are summarized in TABLE 1 below, but allow data transfer to and from the memory elements within the removable memory card 10. Further, the pins may provide power, a clock signal, or similar signals as is well understood. While the present disclosure focuses on the basic SD protocol, the concepts of the present disclosure are also applicable to other flavors of SD memory cards such as miniSD, microSD, SDHC, miniSDHC, microSDHC, and SDXC.

TABLE 1

SD PIN LAYOUT

SD PIN PURPOSE

| Pin | Name | Type | Description |
| --- | --- | --- | --- |
| 1 | CD/DAT3 | I/O/PP | Card detection/Connector data line 3 |
| 2 | CMD | PP | Command/Response line |
| 3 | Vss1 | S | Supply voltage (ground) |
| 4 | Vdd | S | Power supply |
| 5 | CLK | I | Clock |
| 6 | Vss2 | S | Supply voltage |
| 7 | DAT0 | I/O/PP | Connector data line 0 |
| 8 | DAT1 | I/O/PP | Connector data line 1 |
| 9 | DAT2 | I/O/PP | Connector data line 2 |

The form factor for the housing 12 and the layout of the pins 20 is well settled and understood in the industry. As such, there are numerous suppliers who are able to make such housings allowing for price competition in securing such supplies. Thus, the SD form factor provides for a suitable base for a removable memory card that is compliant with the UFS standard.

Figure 3:
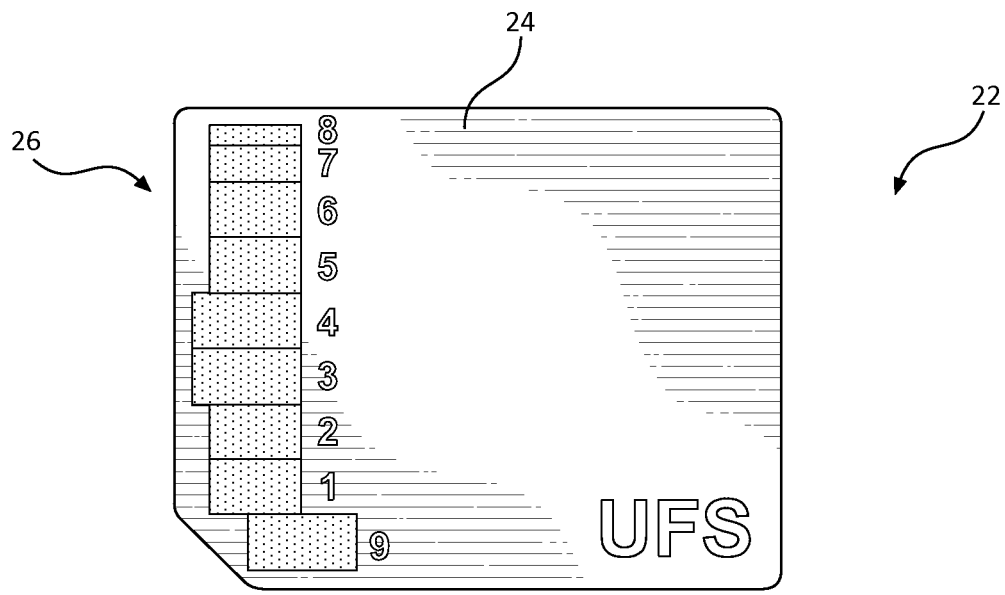
FIG. 3 is a perspective view of a removable memory card conforming to an SD form factor but operating using a Universal Flash Storage (UFS) protocol.

In this regard, FIG. 3 illustrates a removable memory card 22 that is compliant with a UFS protocol. The removable memory card 22 includes a housing 24 that conforms to the SD form factor (e.g., housing 12) with pins 26 conforming to the pin layout of the SD form factor (e.g., pins 20). Note that it is possible that the precise shape of the housing 24 may vary (e.g., be longer, thicker or the like) so long as the pin layout remains the same. While it is contemplated that the pins 26 of the removable memory card 22 will have the same general purpose as the pins 20 of the removable memory card 10 (e.g., power pin 4 still provides Vdd power), the pins 26 may serve a different purpose as explained in greater detail below.

Figure 4:
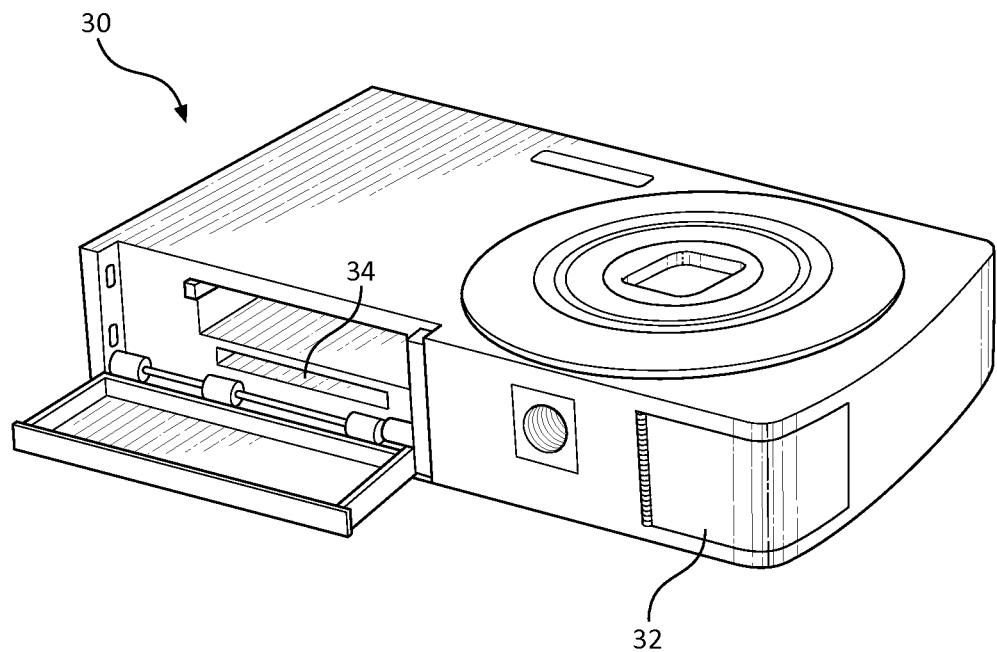
FIG. 4 is a perspective view of a mobile terminal adapted to discriminate between different removable memory cards according to exemplary embodiments of the present disclosure.

It should be appreciated that removable memory cards 10, 22 are well suited for use in computing devices and particularly with mobile terminals such as cameras, phones and the like. In this regard, FIG. 4 illustrates an exemplary mobile terminal 30, which in this case is a camera. The mobile terminal 30 may have an aperture 32 for a battery and a receptacle 34 which is configured to receive a removable memory card such as removable memory cards 10, 22. The mobile terminal 30 has user interface elements such as a user input (e.g., the shutter button (not shown), a display screen (not shown), a touch screen (not shown), or the like). While mobile terminals are specifically contemplated as being suitable for use with embodiments of the removable memory card discrimination systems and methods, other computing devices that use removable memory cards may also benefit from the present disclosure.

Figure 5:
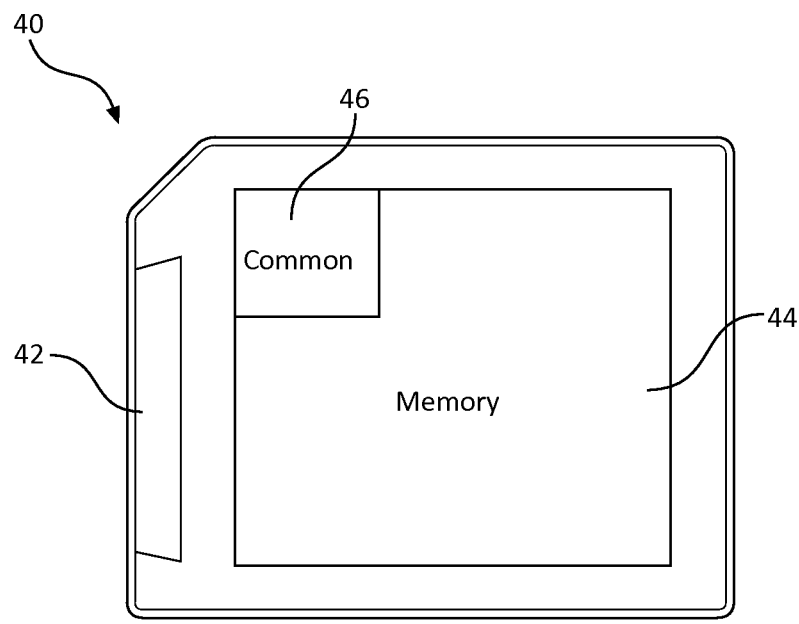
FIG. 5 is a block diagram of select components of a removable memory card.

Before addressing the removable memory card discrimination process, FIG. 5 is a block diagram of components within a removable memory card 40. It should be appreciated that the removable memory card may be compliant with the SD protocol (e.g., removable memory card 10) or with the UFS protocol (e.g., removable memory card 22). The removable memory card 40 has an interface 42 that interoperates with the pins 20, 26 and communicates with memory component 44. Within memory component 44 is a common area 46. In the SD protocol, the common area includes information such as capability descriptors. Exemplary capability descriptors include one data lane capability, four data lane capability, speed rating, and the like. While it is possible that a UFS card such as removable memory card 22 may have similar capability descriptors, the UFS card will also have information that indicates that the card is capable of communicating using the UFS protocol. In an exemplary embodiment, the information that indicates that the card is capable of communicating using the UFS protocol is encoded in a two-bit field.

Figure 6:
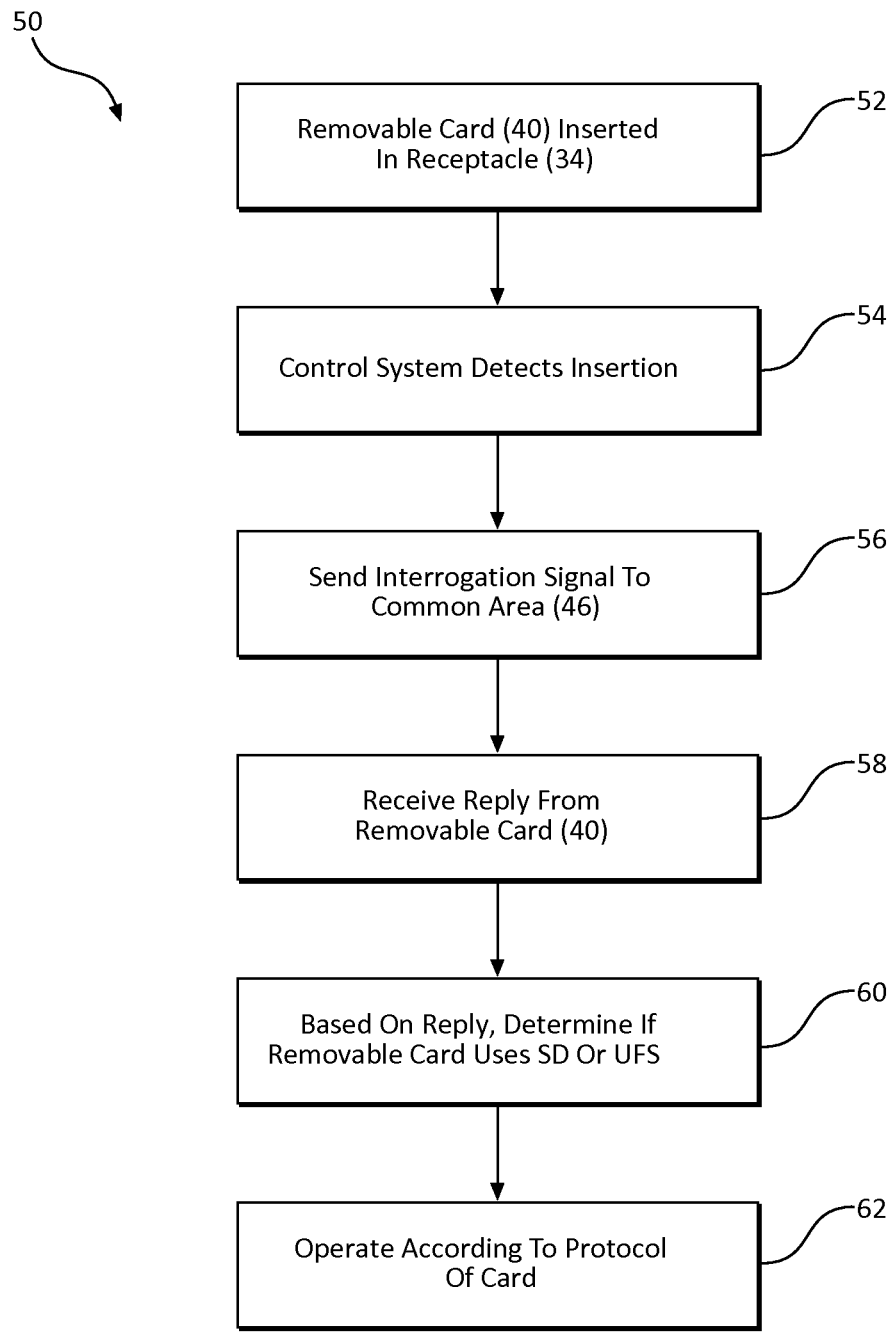
FIG. 6 is a flow chart illustrating a process for discriminating between types of removable memory cards according to an exemplary embodiment of the present disclosure.

Against this backdrop of system elements, a flow chart of process 50 of discriminating between different types of removable memory cards is illustrated in FIG. 6. Process 50 begins when a removable memory card 40 is inserted into a receptacle of a mobile terminal 30 (e.g., receptacle 34) (block 52). The control system of the mobile terminal 30 detects insertion (block 54). Insertion detection may be mechanical such as depression of a switch when the removable memory card 40 is placed in the receptacle, electrical (e.g., a voltage at a pin is pulled down), or other mechanism as desired. After insertion detection, the control system causes an interrogation signal to be sent to the common area 46 of the removable memory card 40 (block 56). The interrogation signal may be compliant with the SD protocol or other low speed serial signal as desired. In an exemplary embodiment, the interrogation signal is sent over the data pins (DAT0-DAT3) of the removable memory card 40 through the interface 42 and to the common area 46. Since UFS is not currently used for removable memory cards, making the UFS compliant memory cards backward compatible with the initial SD interrogation protocols means that the SD protocol (and removable memory cards already compliant with the SD protocol) will not have to be changed and all new UFS compliant removable memory cards will prospectively comply with the proposal set forth herein.

The removable memory card 40 receives the interrogation signal and generates a reply that is received by the mobile terminal (block 58). If the removable memory card is SD compliant, the response contains the capability descriptors stored in the common area. For example, the data lane capabilities may be provided, the voltage signal levels required may be provided, or the like. If the removable memory card is UFS compliant, the response contains information indicating that the removable memory card is UFS compliant. Based on the reply, the control system of the mobile terminal determines if the removable memory card is SD compliant (i.e., card 10) or UFS compliant (i.e., card 22) (block 60).

Once the control system determines the type of card that has been inserted, the control system may operate according to the appropriate protocol (block 62). If the card is SD compliant, the communication continues using an SD protocol. However, if the card is UFS compliant, the control system may restart the communication using UFS protocol. Note that in an exemplary embodiment, the first card may be removed and a second card inserted in which case the determination is performed a second time. Thus, for example, a mobile terminal may use a first UFS compliant card, have that card removed, and then use an SD compliant card.

The removable memory card discrimination systems and methods according to embodiments disclosed herein may be provided in or integrated into any computing device that may also be referred to as a processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 7:
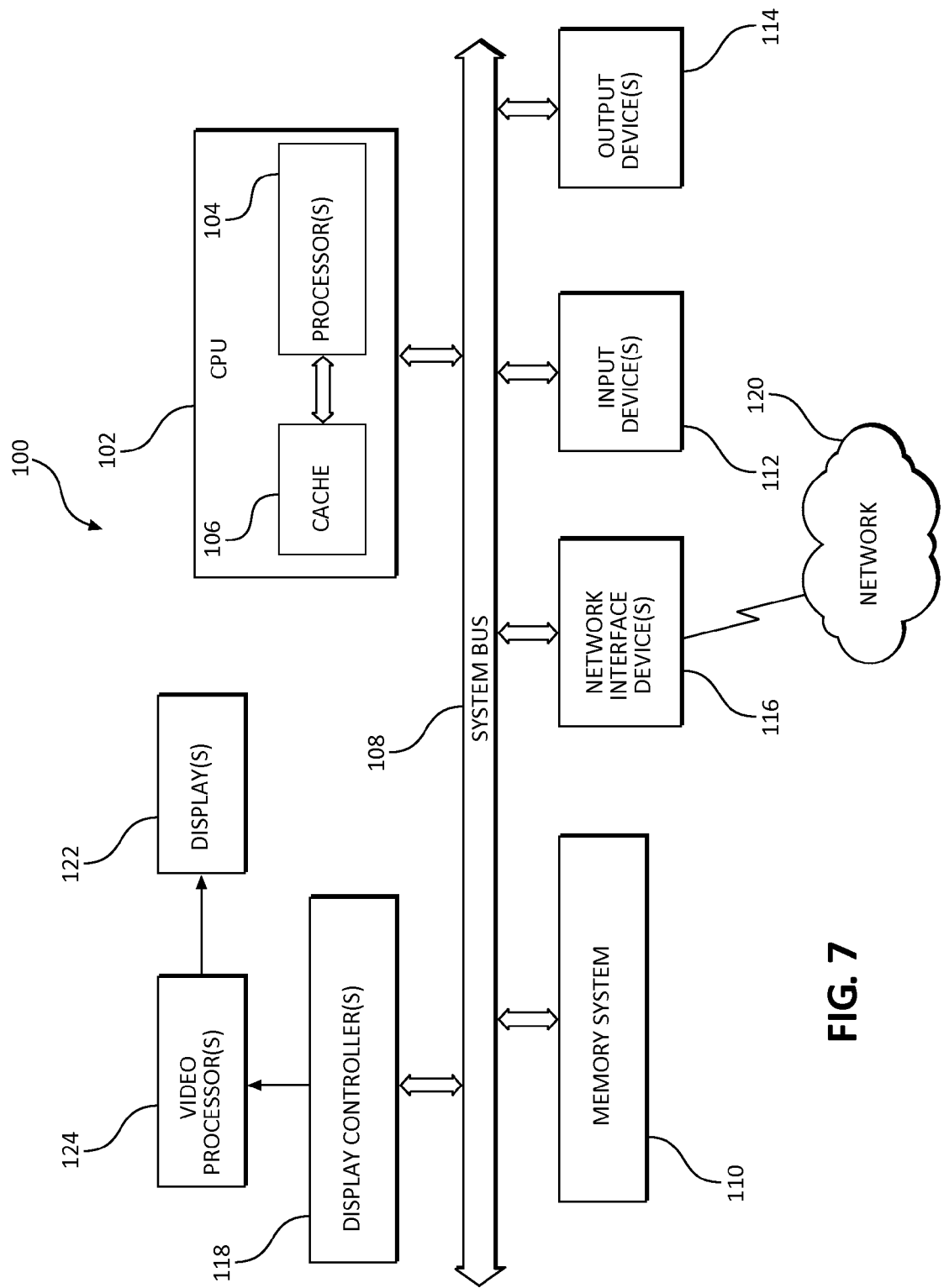
FIG. 7 is a block diagram of an exemplary processor-based system that can be the host configured to receive one or more removable memory cards and discriminate there amongst.

In this regard, FIG. 7 illustrates an example of a processor-based system 100 that can employ removable memory card 40 and/or process 50 illustrated in FIGS. 4 and 6. In this example, the processor-based system 100 includes one or more central processing units (CPUs) 102, each including one or more processors 104. The CPU(s) 102 may have cache memory 106 coupled to the processor(s) 104 for rapid access to temporarily stored data. The CPU(s) 102 is coupled to a system bus 108 and can intercouple master devices and slave devices included in the processor-based system 100. As is well known, the CPU(s) 102 communicates with these other devices by exchanging address, control, and data information over the system bus 108. For example, the CPU(s) 102 can communicate bus transaction requests to the memory system 110 as an example of a slave device.

Other master and slave devices can be connected to the system bus 108. As illustrated in FIG. 7, these devices can include a memory system 110, one or more input devices 112, one or more output devices 114, one or more network interface devices 116, and one or more display controllers 118, as examples. The input device(s) 112 can include any type of input device, including but not limited to input keys, switches, voice processors, etc. The output device(s) 114 can include any type of output device, including but not limited to audio, video, other visual indicators, etc. The network interface device(s) 116 can be any devices configured to allow exchange of data to and from a network 120. The network 120 can be any type of network, including but not limited to a wired or wireless network, private or public network, a local area network (LAN), a wide local area network (WLAN), and the Internet. The network interface device(s) 116 can be configured to support any type of communication protocol desired. The memory system 110 may include receptacle 34 and be configured to interoperate with removable memory cards 40.

The CPU(s) 102 may also be configured to access the display controller(s) 118 over the system bus 108 to control information sent to one or more displays 122. The display controller(s) 118 sends information to the display(s) 122 to be displayed via one or more video processors 124, which process the information to be displayed into a format suitable for the display(s) 122. The display(s) 122 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for discriminating between removable memory cards configured to communicate with a host system according to different communication protocols placed into a host of a computing device, comprising:
   the host sending a secure digital (SD) protocol compliant interrogation signal to a common area on a removable memory card;
   the host receiving a capability descriptor stored in the common area from the removable memory card if the removable memory card is SD protocol compliant;
   the host receiving an indication that the removable memory card is Universal Flash Storage (UFS) capable if the removable memory card is UFS protocol compliant; and
   the host restarting communication using a UFS protocol if the host receives the indication that the removable memory card is UFS capable.

2. The method of claim 1, further comprising detecting insertion of the removable memory card into a receptacle on the computing device.

3. The method of claim 2, wherein detecting insertion of the removable memory card comprises mechanically detecting insertion.

4. The method of claim 2, wherein detecting insertion of the removable memory card comprises electrically detecting insertion.

5. The method of claim 1, further comprising subsequently operating according to an SD protocol.

6. The method of claim 1, further comprising subsequently operating according to the UFS protocol.

7. The method of claim 6, wherein subsequently operating according to the UFS protocol comprises using a pin on the removable memory card in a manner differently than the pin would be used operating under an SD protocol.

8. The method of claim 6, further comprising:
   detecting insertion of a second removable memory card in a receptacle of the computing device; and
   operating according to an SD protocol with the second removable memory card.

9. The method of claim 1, wherein the computing device comprises a mobile terminal.

10. The method of claim 1, wherein sending the SD protocol compliant interrogation signal comprises sending a low speed serial signal.

11. The method of claim 10, wherein sending the low speed serial signal comprises sending a signal without a clock component.

12. The method of claim 1, wherein sending the SD protocol compliant interrogation signal comprises sending an interrogation signal to a common area on a removable memory card conforming to a form factor selected from the group consisting of: SD, miniSD, microSD, secure digital high capacity (SDHC), miniSDHC, microSDHC, and secure digital extended capacity (SDXC).

13. A method for discriminating between removable memory cards configured to communicate with a host system according to different communication protocols placed into a computing device, comprising:
   sending a secure digital (SD) protocol compliant interrogation signal to a common area on a removable memory card;

receiving a response that informs the computing device if the removable memory card is SD protocol compliant or is compliant with a Universal Flash Storage (UFS) protocol; and restarting communication with the removable memory card using the UFS protocol if the response informs the computing device that the removable memory card is UFS protocol compliant.

14. The method of claim 13, wherein the response comprises two bits.

15. The method of claim 13, wherein the response provides a capability descriptor to inform the computing device that the removable memory card is SD protocol compliant.

16. A computing device comprising:
a user interface having one or more hardware elements configured to interface with a user;
a removable memory card receptacle configured to receive a removable memory card; and
a control system operatively coupled to the user interface, the control system configured to:
send a secure digital (SD) protocol compliant interrogation signal to a common area on the removable memory card;
if the removable memory card is SD protocol compliant, receive a capability descriptor stored in the common area from the removable memory card;
if the removable memory card is universal flash storage (UFS) protocol compliant, receive an indication that the removable memory card is UFS capable; and
subsequently restarting communication with the removable memory card if the indication that the removable memory card is UFS capable is received.

17. The computing device of claim 16, wherein the computing device is a mobile terminal and the mobile terminal is selected from the group consisting of: a camera, a phone, a tablet computer, an audio player, a video player, and a laptop computer.

18. The computing device of claim 16, wherein the removable memory card receptacle is configured to receive a form factor conforming to a protocol selected from the group consisting of: SD, miniSD, microSD, secure digital high capacity (SDHC), miniSDHC, microSDHC, and secure digital extended capacity (SDXC).

19. The computing device of claim 16, wherein the control system is further configured to detect insertion of the removable memory card in the removable memory card receptacle.

20. The computing device of claim 16, wherein the removable memory card receptacle comprises pins and wherein the pins operate according to a first purpose when the computing device operates in an SD mode and the pins operate according to a second purpose when the computing device operates in a UFS mode.

* * * * *